Dec. 19, 1967    W. E. RHODES    3,359,387
PRESSURE SWITCH
Filed Oct. 23, 1965    3 Sheets-Sheet 1
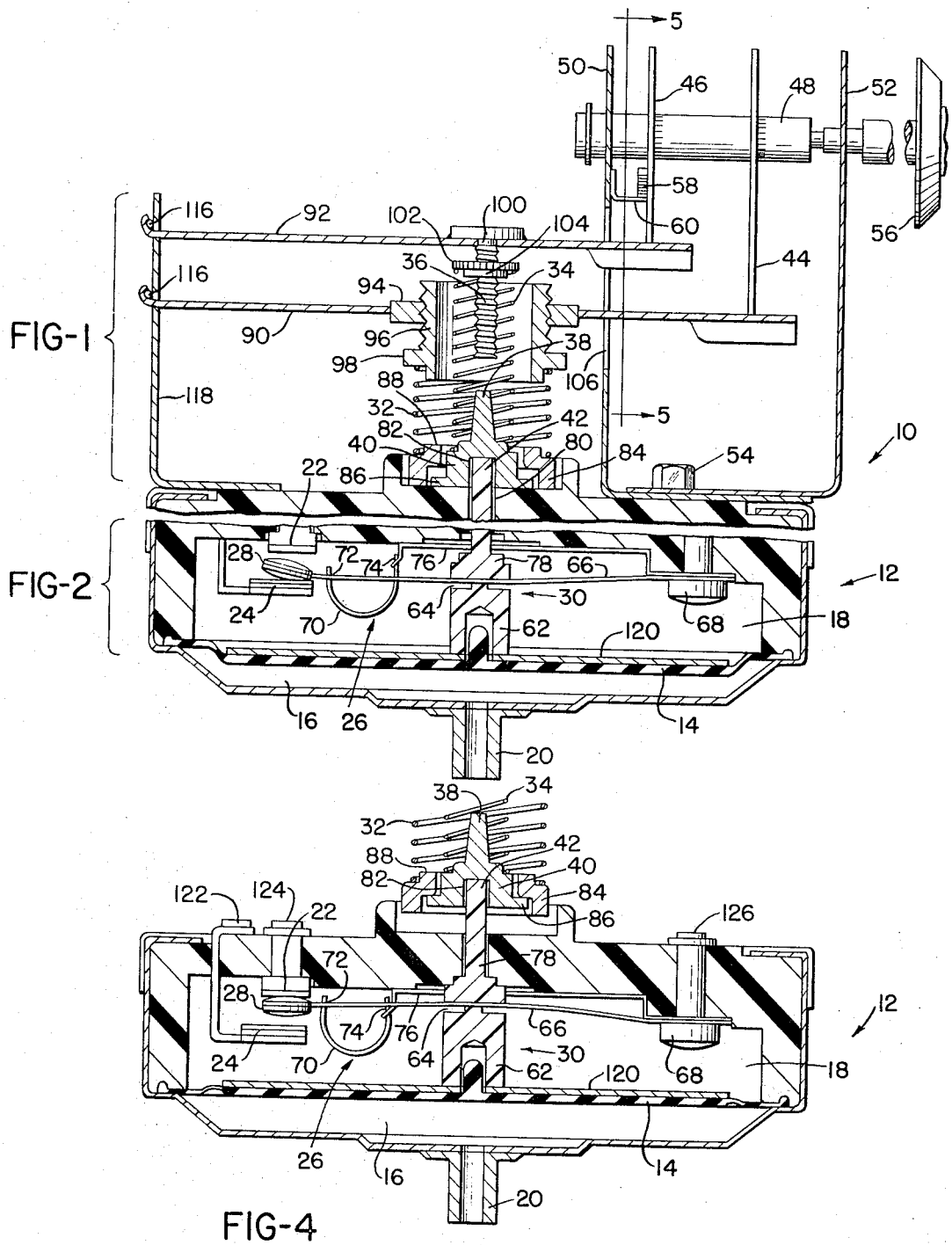
INVENTOR.
WILLIAM E. RHODES
BY
Caudor & Caudor
HIS ATTORNEYS

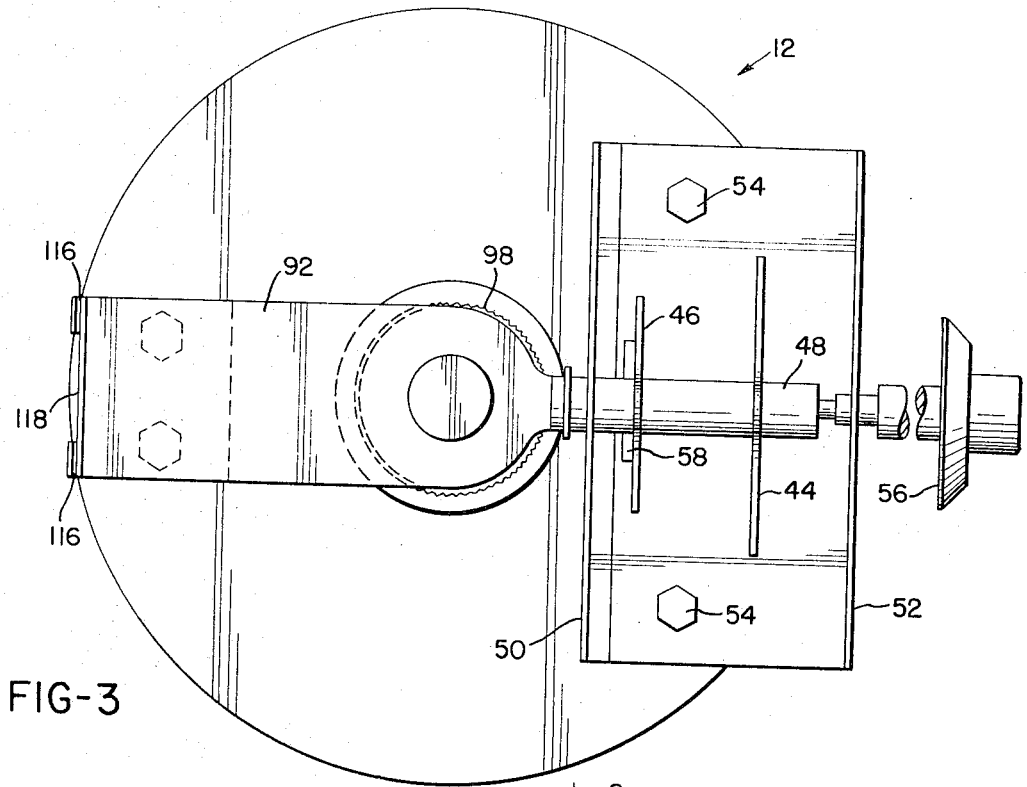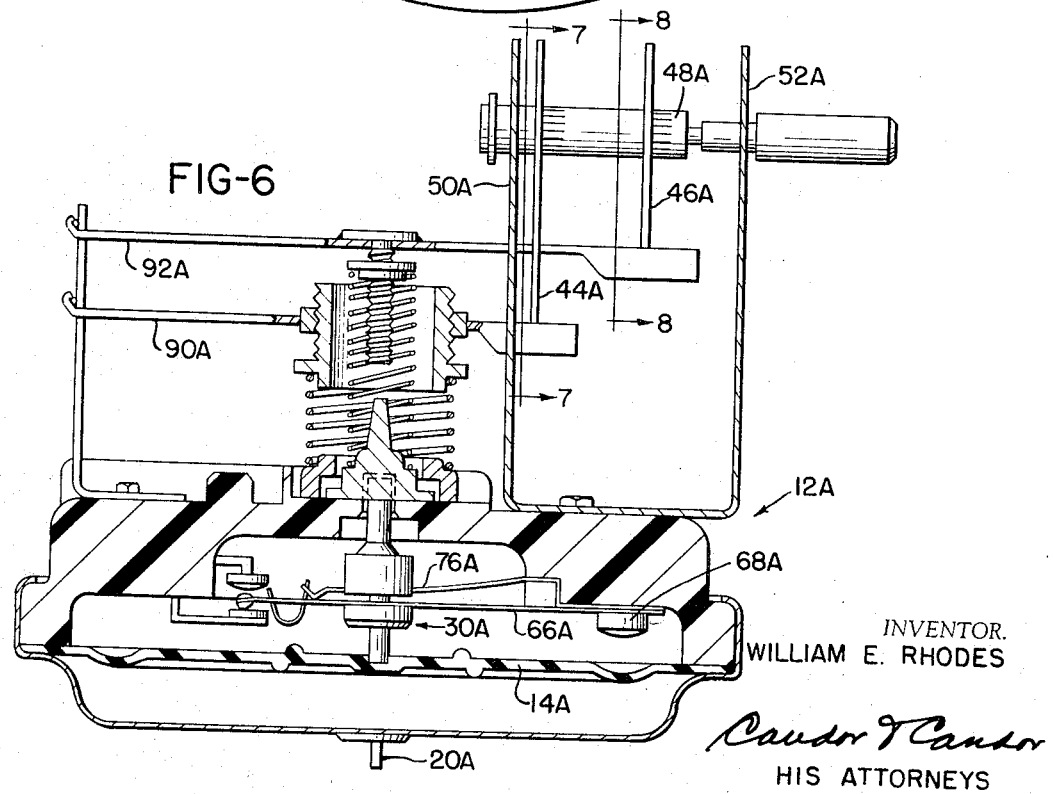

Dec. 19, 1967  W. E. RHODES  3,359,387
PRESSURE SWITCH

Filed Oct. 23, 1965  3 Sheets-Sheet 3

INVENTOR.
WILLIAM E. RHODES
BY
*Candor & Candor*
HIS ATTORNEYS

United States Patent Office 3,359,387
Patented Dec. 19, 1967

3,359,387
PRESSURE SWITCH
William E. Rhodes, Columbus, Ohio, assignor to Robertshaw Controls Company, Richmond, Va., a corporation of Delaware
Filed Oct. 23, 1965, Ser. No. 502,827
10 Claims. (Cl. 200—83)

ABSTRACT OF THE DISCLOSURE

This application discloses a pressure responsive switch with two springs, each of which is associated with a cam follower and cam, each spring being adjustable independently by two cams which may be actuated by a unitary adjusting knob. By controlling the slope of these cams a proportional control is made. The pressure switch may be a water level controller for use with automatic washing machines and the like. A handle or knob may adjust a pair of cams to regulate the high pressure and the low pressure springs. Also other cams may be adjusted outside the casing to vary the proportion between the high pressure springs and the low pressure springs.

---

This invention relates to a pressure switch.

This invention relates to a pressure switch with two springs, each of which is associated with a cam follower and cam. Each spring is adjustable independently. The two cams may be actuated by a unitary manual means, such as a common shaft or other means. By controlling the slope of these cams, a proportional control can be made.

This invention is applicable to a pressure switch, for example, of the water level control type, for use with automatic washing machines and the like. The pressure switch of this invention may have a proportional control so as to make it possible to have the control reset, for example, at 50% of the actuation point. The pressure switch of this invention accomplishes this notwithstanding that it is a multilevel device or control.

Other features are apparent from this description, the appended claimed subject matter, and/or the accompanying drawings, in which:

FIGURE 1 is a vertical cross sectional diagrammatic view of the upper part of the pressure switch.

FIGURE 2 is a diagrammatic vertical cross sectional view of the lower part of the pressure switch, such FIGURE 2 being axially aligned with FIGURE 1, but being rotated 90° about the vertical axis, so that the cooperating parts of FIGURES 1 and 2 may be readily compared.

FIGURE 3 is a diagrammatic top view of FIGURE 1.

FIGURE 4 is a diagrammatic vertical cross section of the lower part of the switch, with the switch in actuated position.

FIGURE 6 is a diagrammatic view of the switch shown in FIGURES 1 and 2, but with a different cam and lever construction.

Figure 5:
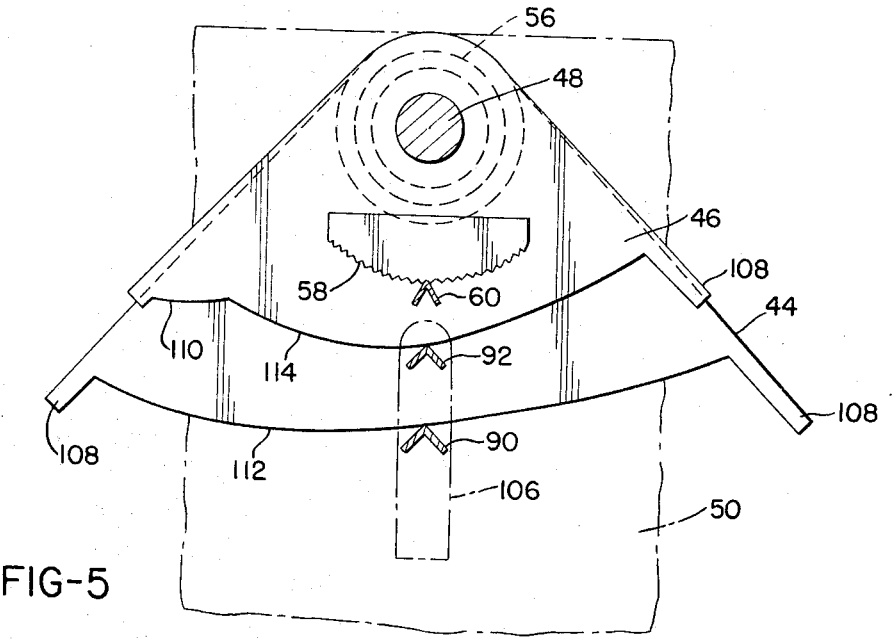
FIGURE 5 is a diagrammatic cross section taken along the line 5—5 of FIGURE 1.
Figure 7:
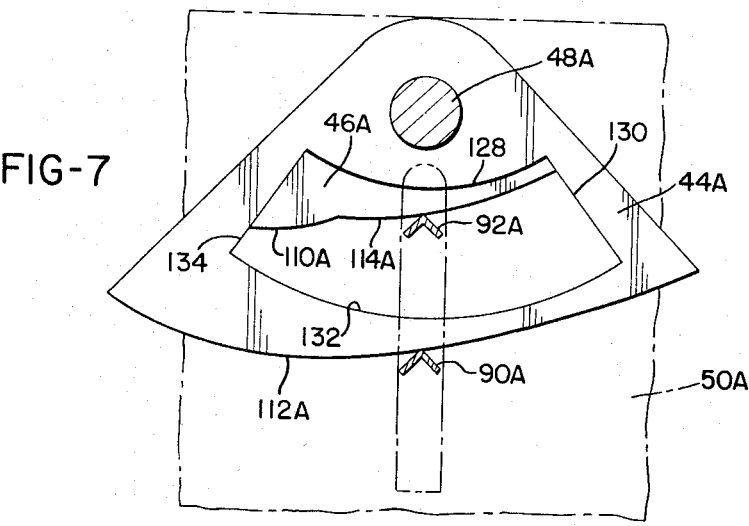
FIGURE 7 is a diagrammatic cross section along the line 7—7 of FIGURE 6.
Figure 8:
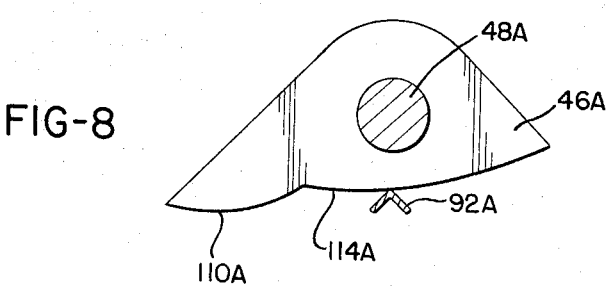
FIGURE 8 is a diagrammatic cross section along the line 8—8 of FIGURE 6.

Certain words are used in this specification and claimed subject matter which may indicate direction, relative position and the like. These claims are used for the sake of brevity and clearness. However, it is to be understood that these words are used only in connection with the drawings, and that in actual use the parts may have entirely different direction, relative position and the like. Examples of such words are "vertical," "horizontal," "upper," "lower," etc.

A control member 10 may include a casing 12, which may have a flexible diaphragm 14, which divides the pressure chamber or control member into a pressure chamber 16 on the one side of the diaphragm 14, and a switch chamber or space 18 on the other side of the diaphragm. A fluid pressure flow connection 20 may introduce and remove pressure fluid from the chamber 16. Such connection 20 may be connected to the water tub of the washing machine in a well known manner to be responsive to the varying levels of water which are introduced and removed from such tub.

A switch construction may be provided in the switch chamber or space 18. Such switch construction may include a first or actuated stationary contact 22 in the switch chamber 18. A second or reset stationary contact 24 may also be provided in the switch chamber 18. A snap blade means 26 may be provided in the switch chamber or space 18 and may be provided with movable contact means 28 alternately to engage the first and second contacts 22 and 24 in response to pressure conditions in the pressure chamber 16.

A connecting means, or plunger 30 connects the diaphragm 14 and the snap blade means 26 to cause the movable contact means 28 alternately to contact such first or actuated contact when a desired high fluid pressure is produced in the pressure chamber 16, such as when the water in the washing machine tub has reached a selected high level which is to be the temporary limit of the filling operation of the tub. The connecting means or plunger 30 also causes the movable contact means 28 to contact or engage the second or reset contact 24 when a desired low reset pressure has been established in the pressure chamber 16, such as is produced when the water in the washing machine tub has reached a desired low or empty condition. The cam means to be described may also cause the connection means or plunger 30 to cause the movable contact means 28 to contact the second or reset stationary contact, even when the water in the tub has been filled to a high level which has been found insufficiently high. The cam means may reset the contacts to permit filling to a higher level.

A first or high pressure control spring 32 may be made effective on the connecting means or plunger 30, to control the pressure at which the snap blade means is moved to the upper position, with the movable contact means 28 in contact with the first or actuated stationary contact 22. This action takes place when the water level, for example, has reached a desired filled position, at which time the filling action of the washing machine is stopped, and other washing machine operations are initiated under the control of the timer, as is well known.

A reset, or second low pressure control spring 34 is effective on the connecting means or plunger 30 to control the pressure in chamber 16 at which the movable contact means 28 is moved downwardly in contact with the second or reset stationary contact 24.

Additionally, a positive reset means 36 may be effective on the plunger or connecting means 30 to cause the movable contact means 28 to be moved downwardly in contact with the stationary contact 24 even when a high pressure prevails in the pressure chamber 16, such as is produced when the washing machine tub has been filled to a selected high level, but which has been found to be insufficiently high, and it is desired further to fill the tub. Under certain conditions, the cam means to be described, can cause the positive reset means 36 to push the upper end 38 of a reset member 40, which in turn contact the upper end 42 of the plunger 30 to cause such plunger 30 to be moved downwardly to force the movable contact means 28 downwardly in contact with the stationary contact 24.

A first or high pressure cam means 44 may be effective to adjust the pressure of the high pressure or first control spring 32.

A second, or reset low pressure cam means 46 may be effective to adjust the second or reset low pressure control spring 34.

Cam adjusting means 48 may be provided to adjust the cams 44 and 46. Such adjusting means 48 may be a unitary adjusting means in the form of a rotatable shaft, which may be carried by the L shaped bracket members 50 and 52, which may be bolted by bolts or screws 54 which pass into the top of the casing 12. If desired, a suitable knob 56 may be provided to turn the shaft 48.

The shaft 48 may be secured in the brackets 50 and 52 in any well known manner to permit the same to be manually rotated, but to be held from axial movement.

If desired, a knurled arc may be engaged by a flexible bent finger 60, which engages the knurled arc 58, and holds the cams at selected positions. Such finger 60 may be secured to the bracket 50 or to any other desired stationary member.

The connecting means or plunger 30 may have a lower body member 62 with a groove 64 to receive the flexible movable snap blade 66. One end of the blade 66 is connected to the conductor bolt member 68, to which one of the electrical lines may be connected. The movable blade 66 may carry the movable contact means 28 at its other end, and may receive one end of a C spring 70 at 72. The other end 74 of the C spring may engage one end of a relatively rigid blade 76. The blade 76 may engage the bottom of the upper wall of the casing 12, and the other end of such rigid blade 76 may be held by the conductor bolt 68 in any well known manner. The blades 66 and 76 may have suitable openings and/or notches where necessary, as is now well known, so that the parts may actuate up and down without interengaging each other except where it is desired for them to engage each other.

The connecting means or plunger 30 may have an upper body 78, which is relatively narrow, and may extend upwardly through the opening 80 of the top wall of the casing 12. The upper end 42 of the upper body 78 extends upwardly into an opening 82 in the reset member 40. Upward and downward movement of the plunger 30 may, at proper times, cause the reset member 40 to move upwardly and downwardly by the engagement of the members 42 and 82 at their upper ends.

The lower end of the high pressure control spring 32 may engage a vertically movable ring 84. The ring 84 may rest on the top surface of the upper casing wall under reset conditions. An outward flange 86 is provided on the reset member 40.

The flange 86 of the reset member 40, under reset conditions, does not engage the ring 84, since it is slightly spaced below the upper flange 88 of the ring 84. However, when the pressure in the pressure chamber 16 starts to increase, such as when the tub is being filled, the diaphragm 14 moves the plunger 30 upwardly and thereby causes the reset member 40 to be moved upwardly so that the flange 86 of the reset member 40 engages the flange 88 of the ring 84. This causes the ring 84 to move upwardly away from the top surface of the casing 12, so that the pressure of the spring 32 then becomes effective on the plunger 30 through the medium of the flanges 88, 86, the end portions 42 and 82 and the narrow portion 78 of the plunger. Therefore, the pressure of the spring 32, in combination with a lesser pressure of the spring 34, determines the value at which the pressure in the chamber 16 will cause the contact means 28 to snap upwardly from the stationary contact 24 to the upper stationary contact 22.

A first, or high pressure adjusting lever 90 engages the first or high pressure control spring 32. A second or low pressure reset lever 92 engages the second or reset low pressure control spring 34. The lever 90 is adjusted by the first or high pressure cam means 44, and the lever 92 is adjusted by the second or reset low pressure cam means 46.

The lever 90 may be provided with an internally threaded ring 94, which threadedly engages the externally threaded cylinder 96. The cylinder 96 is provided with a knurled flange 98, which engages the upper end of the spring 32. Therefore, the effectiveness of the lever 90 may be varied at the factory and may be adjusted as desired, by turning the knurled flange 98, and causing the cylinder 96 to be turned to raise or lower it with respect to the internally threaded ring 94.

The lever 92 may have the positive reset means, or externally threaded pin 36 fixedly secured at 100 to the lever 92. The positive reset means or externally threaded pin 36 may be engaged by the internally threaded ring or washer 102, so that turning of the ring or washer 102 causes such ring to move up and down, and thus further adjust the effectiveness of the lever 92 on the spring 34. The upper end of the spring 34 engages the knurled flange ring 102. A ring body 104 extends downwardly, to hold the spring 34 from lateral displacement.

The levers 90 and 92 pass through a slot 106 shown in dotted lines in FIGURE 5, which slot is in the bracket 50, which is also shown in dotted lines in FIGURE 5. The slot 106 may be sufficiently wide for the ends of the levers 90 and 92 to pass therethrough, but is sufficiently narrow to prevent any substantial sidewise movement of such levers.

If desired, rotational limit means or flanges 108 may be provided. Also, if desired, a positive reset curve 110 may be provided to cause a positive reset action when it is desired to cause the movable contact 28 to move downwardly even when there is an insufficiently filled high level of liquid in the tub. The curve 110 acts on the end of lever 92 and pushes it downwardly in sufficient amount so that the positive reset means 36 engages the end 38 of the reset member 40, and pushes such reset member 40 and the plunger 30 downwardly to the resetting position such as is shown in FIGURES 1 and 2. After such positive resetting operation, the cams may be adjusted to provide the newly desired high level of liquid in the tub or the like.

FIGURE 5 shows a lower edge curve 112, which is effective on the lever 90, as the cam 44 is rotationally moved by the shaft 48. This curve edge 112 may be any desired curve to produce the desired upper level pressures to which the device is responsive. Thus, the high pressure curve 112 determines the values of the level to which the washing machine tub is to be filled, depending upon the angular rotational position of the cam 44.

Likewise, a reset curve 114 may be provided by the end of the lever 92. The curve 114 determines the various reset pressures at which the movable contact means 28 is to be moved downwardly from the upper stationary contact 22 to the lower stationary contact 24. These curves are arbitrarily drawn. It is to be understood that they may have any desired shape, so that the relative high pressure and low pressure at any one shaft setting of 48 can be produced as desired.

As shown in FIGURES 1 and 5, the lever 90 passes around or under the edge of the cam 46 in a free manner, and engages the lower side of the cam 44 without disturbing the cam 46.

The levers 90, 92 may be pivoted on pins 116, which may be carried by bracket means 118.

If desired, a rigid disc of metal or the like 120 may be provided to prevent the diaphragm 114 from flexing except that its edges as is illustrated in FIGURES 2 and 4.

FIGURE 4 illustrates the action that takes place when the diaphragm 14 has been moved upwardly, to cause the upper end 42 of the plunger 30 to push the reset member 40 upwardly, and to cause the flange 86 to lift the flange 88 of the ring 84 upwardly, so that the full pressures of the springs 32 and 34 are effective to determine at what pressure the blade 66 is to snap upwardly to move the movable contact 28 into contact with the upper stationary contact 22 and away from the stationary contact 24. FIGURE 4 also shows how the stationary contacts 22 and 24 may be connected to the outside electrical connectors 122, 124 and 126, so that the electrical connectors 122 and 124 may be alternately connected to the connector 126, by the switch means.

FIGURE 6 shows diagrammatically substantially the same elements which have been shown in connection with FIGURES 1–5. The only difference intended to be shown is that the lever 90A is engaged by the cam 44A, which is the nearest to the bracket 50A. The lever 92A passes through the cam 44A, without disturbing it, and engages the lower surface of the cam 46A. The cams are rotated by the shaft 48A. FIGURE 6 shows the cam 44A with a lower surface 112A, so that it can operate substantially as was done in connection with cam 44 and surface 112 in the previous figures. The cam 44A has an opening indicated by the lines 128, 130, 132, and 134, which surround an arc shaped opening in the cam 44A, through which the lever 92A can pass, and reciprocate, without disturbing the cam 44A, and so that the lever 92A can engage the lower surface 114A of the cam 46A, as desired. If desired, the positive reset curve 110A may be provided to produce substantially the same action as is produced by the curve 110 of FIGURE 5.

The casing 12 may have a circular, square or other horizontal cross section, as desired.

Thus it is to be seen that a new, unobviouss and useful pressure switch has been provided, which is capable of providing adjustments for widely different high pressure conditions and reset conditions, and the like.

While the form of the invention now preferred has been disclosed as required by statute, other forms may be used, all coming within the scope of the claimed subject matter which follows.

What is claimed is:
1. In combination:
a casing having a flexible diaphragm dividing said casing into a pressure chamber on one side of said diaphragm and a switch chamber on the other side of said diaphragm, and with a fluid pressure flow connection into said pressure chamber;
a stationary actuated contact in said switch chamber and carried by said casing;
a stationary reset contact in said switch chamber and carried by said casing;
snap blade means in said switch chamber with movable contact means alternately to engage said actuated and reset contacts;
connecting means connecting said diaphragm and snap blade means to cause said movable contact means alternately to contact said actuated contact when a desired high fluid pressure is produced in said pressure chamber and to engage said reset contact when a low reset pressure is produced in said pressure chamber;
a high pressure control spring carried by said casing and effective on said connecting means;
a reset low pressure control spring carried by said casing and effective on said connecting means;
a high pressure cam means carried by said casing and effective to adjust said high pressure control spring;
a reset low pressure cam means carried by said casing and effective to adjust said reset low pressure control spring;
and cam adjusting means carried by said casing and having manually operable means outside said casing to adjust said high pressure cam means and said reset low pressure cam means.

2. A combination according to claim 1 in which:
said connecting means includes a plunger carried by said casing and connected to said diaphragm and said snap blade means;
a high pressure adjusting lever is carried by said casing and engages said high pressure control spring, and is adjusted by said high pressure cam means;
a low pressure reset lever is carried by said casing and engages said reset low pressure control spring and is adjusted by said reset low pressure cam means.

3. A combination according to claim 2 in which said cam adjusting means is a uiitary cam adjusting means, carried by said casing, and in which said unitary cam adjusting means includes a rotatable shaft carried by said casing upon which said high pressure cam means and said reset low pressure cam means are mounted, and in which one of said cam means adjusts one of said levers and allows the other of said levers freely to pass to be adjusted by the other of said cam means, and in which the other of said levers passes freely through said one of said cam means.

4. In combination:
a casing having a flexible diaphragm providing said casing with a pressure chamber on one side of said diaphragm and a switch space on the other side of said diaphragm, and with a fluid pressure flow connection into said pressure chamber;
a first stationary contact in said switch space and carried by said casing;
a second stationary contact in said switch space and carried by said casing;
snap means in said switch space with movable contact means alternately to engage said first and second stationary contacts;
connecting means connecting said diaphragm and said snap means to cause said movable contact means alternately to contact said first and second stationary contacts;
a first pressure control spring carried by said casing and effective on said connecting means;
a second pressure control spring carried by said casing and effective on said connecting means;
a first cam means carried by said casing and effective to adjust said first pressure control spring;
a second cam means carried by said casing and effective to adjust said second control spring;
and cam adjusting means carried by said casing and having manually operable means outside said casing to adjust said first and second cam means.

5. A combination according to claim 4 in which:
said connecting means includes a plunger carried by said casing and connected to said diaphragm and said snap means;
a first pressure adjusting lever is carried by said casing and engages said first pressure control spring;
a second pressure adjusting lever is carried by said casing and engages said second pressure control spring.

6. A combination according to claim 4 in which a first lever is carried by said casing and engages said first spring and said first cam means adjusts said first lever, and in which a second lever is carried by said casing and engages said second spring and said second cam means adjusts said second lever.

7. A combination according to claim 6 in which said one of said levers passes through the cam means that adjust the other lever.

8. In combination:
a casing having a flexible fluid impermeable member providing said casing with a pressure chamber and a switch space separated by said impermeable member, and with a fluid flow connection into said pressure chamber;
switch means in said switch space and carried by said casing and movable to different switch conditions by said impermeable member:
a pressure control first spring means carried by said casing and effective on said impermeable member;
a pressure control second spring means carried by said casing and effective on said impermeable member;

a first spring adjuster carried by said casing and effective to adjust said first spring means;

a second spring adjuster carried by said casing and effective to adjust said second spring means;

and simultaneously movable adjusting means carried by said casing and having manually operable means outside said casing to adjust said first and second adjusters.

9. A combination according to claim 8 in which a plunger is carried by said casing and connects said first and second adjusters with said impermeable member.

10. A combination according to claim 9 in which said casing has a casing wall with an arresting surface through which said plunger passes; a ring carried by said casing with a rim engaging said arresting surface, with a shoulder and an inward flange; said first spring means having an end engaging said shoulder; a ring moving member carried by said casing and engaging said arresting surface, having a second spring receiving shoulder, having an outward flange spaced from but engageable with said inward flange and having an opening with an end wall receiving the end of said plunger; said second spring means having an end engaging said second spring receiving shoulder and in which said first spring adjuster includes a lever with a longitudinally adjustable cylinder engaging the other end of said first spring means, and in which said second adjuster includes another lever with a longitudinally adjustable spring end receiving means receiving the other end of said second spring means.

References Cited

UNITED STATES PATENTS

| | | | |
|---|---|---|---|
| 2,636,093 | 4/1953 | Clark et al. | 200—83.9 |
| 2,934,618 | 4/1960 | Beller et al. | 200—83.9 |
| 3,209,094 | 9/1965 | Baver | 200—83.9 |
| 3,304,385 | 4/1967 | Vollbehr | 200—83 |

BERNARD A. GILHEANY, *Primary Examiner.*

H. B. GILSON, *Assistant Examiner.*